(12) United States Patent
Mattes

(10) Patent No.: US 11,965,547 B2
(45) Date of Patent: Apr. 23, 2024

(54) BEARING BUSH AND JOURNAL BEARING ASSEMBLY

(71) Applicant: AKTIEBOLAGET SKF, Gothenburg (SE)

(72) Inventor: Manfred Mattes, Kolbingen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/839,794

(22) Filed: Jun. 14, 2022

(65) Prior Publication Data

US 2022/0403880 A1 Dec. 22, 2022

(30) Foreign Application Priority Data

Jun. 22, 2021 (DE) .......................... 102021206412.4

(51) Int. Cl.
*F16C 21/00* (2006.01)

(52) U.S. Cl.
CPC ........ F16C 21/005 (2013.01); *F16C 2326/06* (2013.01)

(58) Field of Classification Search
CPC ........ F16C 19/24; F16C 19/28; F16C 19/466; F16C 21/005; F16C 2326/06; F16D 3/33; F16D 3/385; F16D 3/41; F16D 3/43
See application file for complete search history.

(56) References Cited

U.S. PATENT DOCUMENTS

| | | | | |
|---|---|---|---|---|
| 3,074,255 A * | 1/1963 | Reinecke | ................ | F16C 19/28 464/130 |
| 4,050,130 A * | 9/1977 | Pitner | ..................... | F16C 17/08 29/898.07 |
| 4,325,593 A * | 4/1982 | Mallet | .................. | F16C 21/005 384/127 |
| 4,445,875 A * | 5/1984 | Kosuda | ............... | F16C 33/6611 464/903 |
| 4,482,337 A * | 11/1984 | Petrzelka | ................ | F16C 23/08 464/132 |
| 7,118,484 B2 * | 10/2006 | Sekine | .................. | F16C 21/005 464/132 |

FOREIGN PATENT DOCUMENTS

| | | | |
|---|---|---|---|
| CN | 105402260 | * | 3/2016 |
| DE | 1288373 | * | 1/1969 |
| DE | 102014216516 | * | 2/2016 |
| FR | 1278541 | * | 12/1961 |

\* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A bearing bush configured to support a journal of a journal cross of a cardan shaft includes a cylindrical circumferential wall that radially delimits an interior for receiving rolling elements and the journal and includes a base axially delimiting the interior. The base has a central holder configured to receive a slip disk for contacting the journal. The base may include a conical portion extending from the cylindrical circumferential wall and a flat central portion, and the holder may be formed as a depression in the flat central portion. Also a journal bearing assembly including the bearing bush.

10 Claims, 2 Drawing Sheets

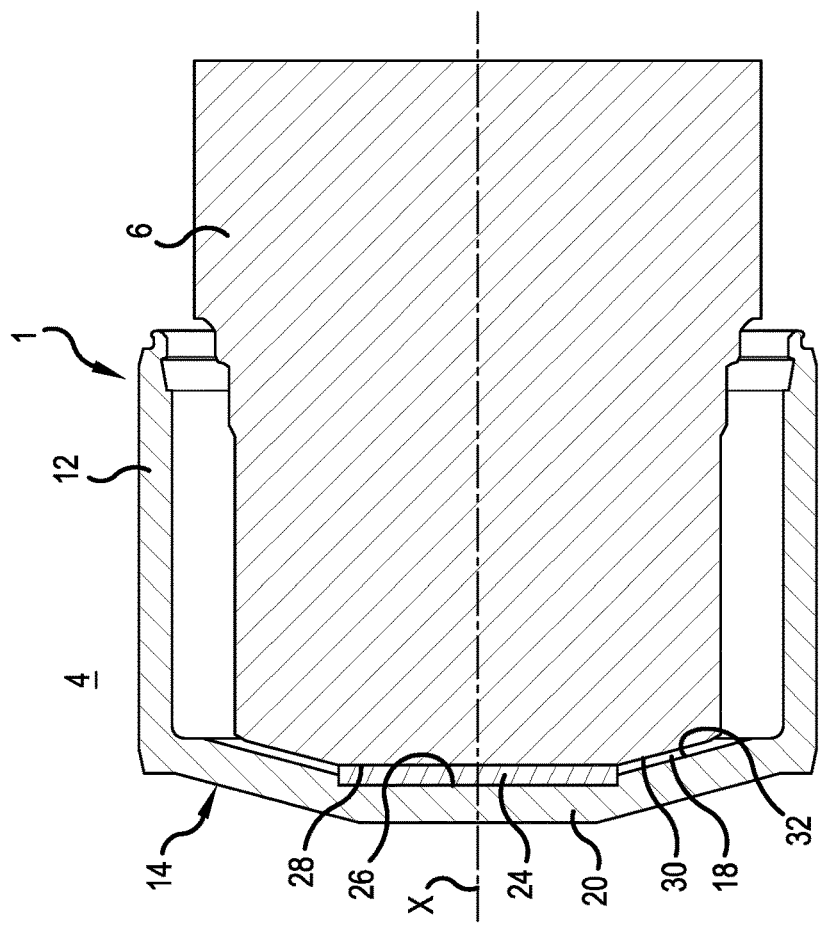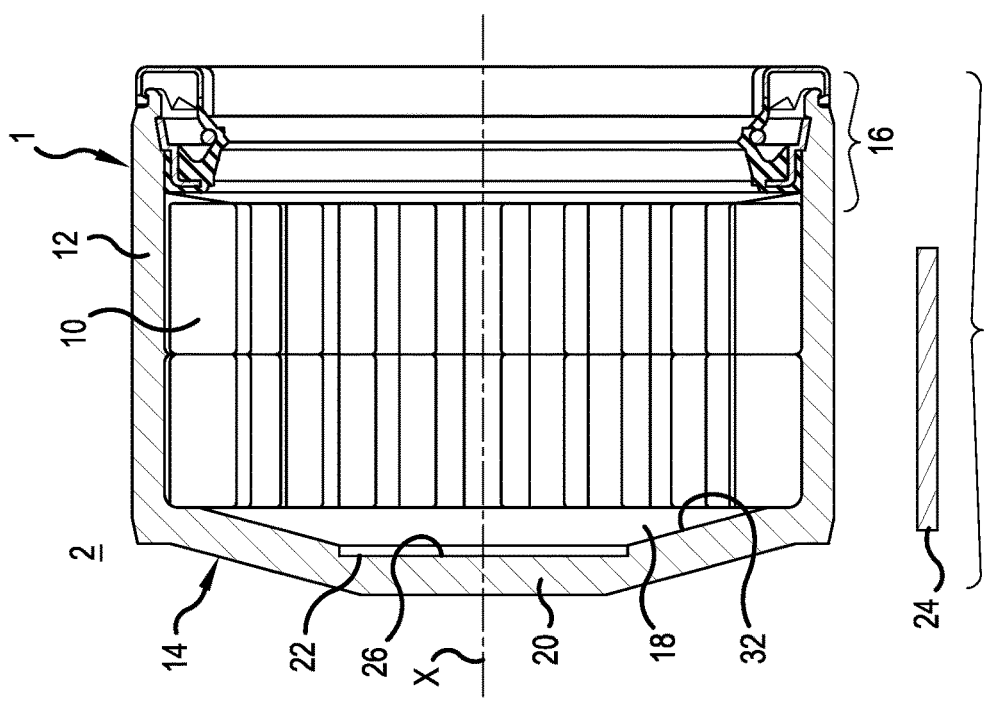

BEARING BUSH AND JOURNAL BEARING ASSEMBLY

CROSS-REFERENCE

This application claims priority to German patent application no. 10 2021 206 412.4 filed on Jun. 22, 2021, the contents of which are fully incorporated herein by reference.

TECHNOLOGICAL FIELD

The present disclosure is directed to a bearing bush for a journal of a journal cross of a cardan shaft a journal bearing assembly including such a bearing bush.

BACKGROUND

Cardan shafts, for example, drive cardan shafts in trucks, are routinely comprised of a plurality of partial cardan shafts connected to one another in an articulated manner. The connecting points of the partial drive shafts include a journal cross, of which two aligned journals interact with a universal joint yoke of the partial drive shafts. The support of the journals in yoke eyes is effected via individual rolling-element bearings that compensate for the axial offset of the partial drive shafts with respect to each other and carry out oscillating movements. Four rolling-element bearings are provided per journal cross. Known rolling-element bearings used for the journal crosses have a cup-shaped bearing bush that forms an interior for receiving their rolling elements and the respective journal. The journals usually have a mandrel-shaped, central depression on their end side. The depressions serve for receiving a retaining mandrel during the grinding of the journals. In order to avoid rubbing against the base of the bearing bushes, a slip ring is inserted in the bottoms of the bearing bushes. An outer diameter of the slip ring is almost identical to a base diameter. An inner diameter of the slip ring is chosen such that the journal-side central depression is almost omitted. For this purpose see also the left-side depiction in FIG. 3, which shows such a bearing 40 according to the prior art. The slip ring is indicated by the reference number 42.

SUMMARY

An aspect of the present disclosure is to provide an alternative bearing bush and an alternative journal bearing assembly that can assume a higher load with the same rotational diameter.

The disclosed bearing bush for a journal of a journal cross of a cardan shaft has a cylindrical circumferential wall that delimits an interior for receiving rolling elements and the journal. In addition, the bearing bush has a base that axially delimits the interior. According to an embodiment of the disclosure, the base has a central holder for receiving a slip disk.

Due to the central arrangement of the slip disk, its diameter is significantly smaller than the outer diameter of the slip ring. Experiments showed a reduction of nearly 50% with the same sized bearing bush. This leads on the one hand to a reduction of the friction in each journal bearing assembly, and on the other hand, viewed over all journal bearings of a cardan shaft, for example, 32 journal bearings, to a considerable reduction of the friction and thus to a considerable energy savings. The arrangement of the slip disk in the center of the base also makes possible longer rolling elements, since the rolling elements can be guided directly up to the base, and the thickness of a slip ring no longer need be taken into account. Alternatively or simultaneously, the rolling-element bearings for the present bearing bush can have a larger outer diameter, and only one rolling-element row can be implemented, which in combination results in a lower noise development.

In one preferred embodiment of the bearing bush, the base is set back axially such that the interior is essentially expanded conically. Here the holder is introduced as a depression in a flat central section of the base. Ridges or a circumferential ridge, are, for example, an alternative holder. The central section is oriented orthogonal to the longitudinal axis of the bearing bush, wherein a base ring surrounding the central section is embodied conical. Due to the axial setback of the base, the interior is enlarged for receiving a central end surface section of the journal via which the journal is supported on the slip disk.

The slip disk preferably has a diameter that is three to four times smaller than an inner diameter of the circumferential wall. Such a diameter ratio has proven to be particularly favorable.

The disclosed journal bearing assembly of a cardan shaft has the disclosed bearing bush and a journal. The journal has a flat central end-surface section, and a slip disk is inserted in a bottom central depression of the bearing bush. Here the journal abuts against the slip disk by its central end-surface section.

It has been found to be advantageous if an oscillating relative movement occurs between the slip disk and the base of the depression instead of between the slip disk and the journal-side end-surface section. This can be achieved by the end-surface section having a greater roughness than the base of the depression.

In the following, preferred exemplary embodiments of the Figures are explained in more detail with reference to greatly simplified schematic illustrations.

BRIEF DESCRIPTION OF THE DRAWINGS

FIG. 1 is a longitudinal section through a bearing including a bearing bush according to an embodiment of the present disclosure.

FIG. 2 is journal bearing assembly including the bearing bush of FIG. 1.

DETAILED DESCRIPTION

Figure 3:
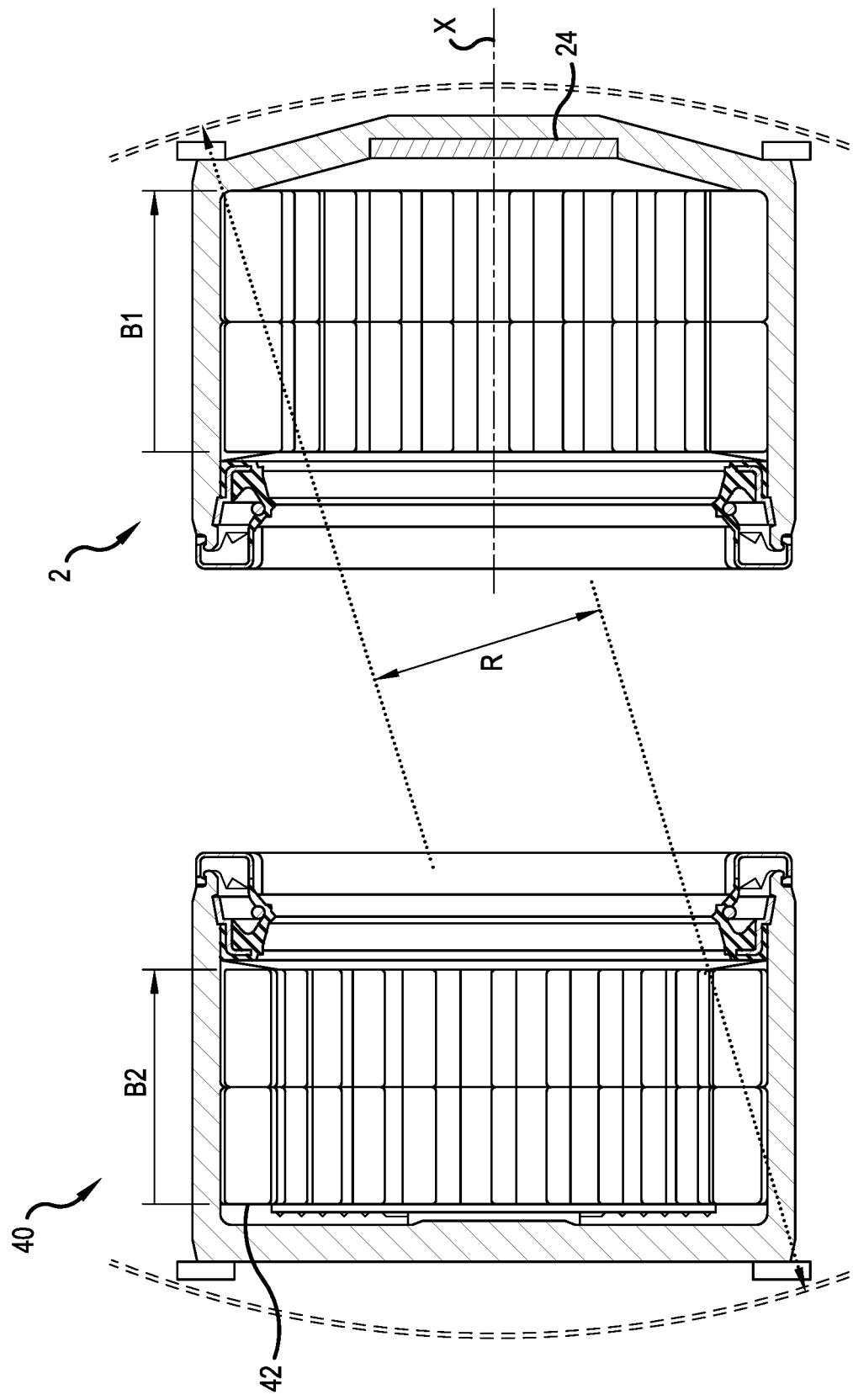
FIG. 3 is a comparison between a conventional bearing bush and a bearing bush according to FIG. 1 with a same rotational diameter.

FIG. 1 shows an exemplary embodiment of a bearing bush 1 as a component of a bearing 2, and FIG. 2 shows a journal bearing assembly 4 that includes the bearing bush 1. For better understanding, both Figures are described simultaneously.

The bearing 1 serves for supporting a journal cross in cardan shafts, in particular of truck drive cardan shafts. Four bearings 2 are necessary for each journal cross. In the installed state, each bearing 2 forms a journal bearing assembly 4 with a journal 6. The bearings 2 compensate for oscillating movements of the partial cardan shafts connected to each other via the journal cross.

Each bearing 1 includes a cup-shaped bearing bush 1 and rolling elements 10 (not shown in FIG. 2). The bearing bushes 1 are each inserted in a yoke eye of the two interacting universal joint yokes. In the inserted state their longitudinal axes x extend orthogonally to the longitudinal axis of the cardan shaft, wherein the individual bearing longitudinal axes x meet at the cardan shaft longitudinal axis. The cup-shaped bearing bush 1 is formed by a cylindrical circumferential wall 12 and by a base 14 that together form an interior for receiving the rolling elements 10, or the rolling-element rows, and the respective journal 6 of the journal cross. For axially securing and sealing the rolling elements 10, a sealing and retaining assembly 16, which is not described in more detail here (and which is not shown in FIG. 2) is inserted at the open end of the bearing bush 1. So-called needle bodies are exemplary rolling elements.

The base 14 of the bearing bush 1 is displaced axially backward or outward relative to the rolling elements 10 to form a conical extension 18 of the interior. A central base section 20 is flat and includes a depression 22 into which a slip disk 24 is inserted for interacting with the journal 6. For reasons of clarity, in FIG. 1 the slip disk 24 is not inserted into the depression 22, but rather illustrated lying outside the bearing bush 1.

The slip disk 24 and the depression 22 have corresponding circular contours. The slip disk 4 lies on a base 26 of the consequently central depression 22 and protrudes axially over an edge section of the base 14, which edge section surrounds the depression 22. The slip disk 24 is thus thicker than the depth of the depression 22. The slip disk 24 preferably has a diameter that is three to four times smaller than an inner diameter of the circumferential wall 12 in the region of the base 14 (that is, has a diameter about 0.25 to 0.33 of the inner diameter of the circumferential wall 12). The slip disk 24 can be comprised of plastic or a metallic material.

For interacting with the slip disk 24, the journal 6 has a central flat end-surface section 28 that is surrounded by a set-back (beveled) conical end-surface ring 30. The diameter of the central end-surface section 28 is selected such that it abuts against the slip disk 24 over its entire surface; the slip disk 24 and the end-surface section 28 preferably have the same diameter. The inclination of the end-surface ring 30 is preferably such that it is uniformly spaced from an opposing beveled base ring 32 surrounding the central base section 20.

The end-surface section 28 preferably has a greater roughness than the base 26 of the depression 22, so that with the slip disk 24 embodied identically on both sides, oscillating relative movements are carried out between the slip disk 24 and the bearing-bush-side base 26 of the recess 22, and not between the slip disk 24 and the journal-side end-surface section 28. The required roughness of the end-surface section 28 can be set, for example, during the face turning itself.

FIG. 3 shows that with the same rotational diameter R, the present bearing bush 1 makes possible a bearing 2 having a larger width B1 than a conventional bearing 40 (width B2) according to the prior art.

This makes possible the supporting of a higher load by the disclosed bearing 1 with the same rotational diameter R. Alternatively this allows a smaller rotational diameter with the same load than a conventional bearing 1. For the sake of completeness the slip disk 26 in the bearing 2, and a slip ring 42 in the conventional bearing 40 according to the prior art are numbered.

Disclosed are a bearing bush 1 for a journal 6 of a journal cross of a cardan shaft including a cylindrical circumferential wall 12 that axially delimits an interior for receiving rolling elements 10 and the journal 6, and including a base 14 that axially delimits the interior, wherein the base 14 has a central depression 22 for receiving a slip disk 24 for the journal 6, and a journal bearing assembly 4 including such a bearing bush 1.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing bushes and journal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing bush
2 Bearing
4 Journal bearing assembly
6 Journal
10 Rolling element
12 Circumferential wall
14 Base
16 Sealing and retaining assembly
18 Conical extension
20 Central base section
22 Depression
24 Slip disk
26 Base of the depression
28 Central end-surface section
30 Beveled end-surface ring (conical)
32 Base ring (conical)
40 Bearing according to the prior art
42 Slip ring according to the prior art
x Longitudinal axis
R Rotation radius
B1 Width of the bearing bush according to the invention
B2 Width of the bearing bush according to the prior art

What is claimed is:

1. A journal bearing assembly of a cardan shaft comprising:
   rolling elements,
   a journal, and
   a bearing bush including:
      a cylindrical circumferential wall having an interior surface radially delimiting an interior for receiving the rolling elements and the journal, and
      a base having an interior surface axially delimiting the interior, the interior surface of the base having a flat central portion and a conical portion extending radially outward from the flat central portion,
wherein the base includes a central holder and a slip disk received in the central holder for contacting the journal,
the journal having a flat central end surface abutting against the slip disk, wherein the central end surface has a greater roughness than a roughness of the flat central portion of the interior surface of the base.

2. The bearing bush according to claim 1,
wherein the slip disk has a diameter 0.25 to 0.33 times an inner diameter of the circumferential wall.

3. The bearing bush according to claim 1,
wherein the slip disk does not have a central opening.

4. The journal bearing assembly according to claim 1,
wherein the journal has a conical section surrounding the flat central end surface, the conical section of the journal opposing the conical portion of the interior surface of the base.

5. A journal bearing assembly of a cardan shaft, comprising:
 a journal of a journal cross of the cardan shaft, and
 a bearing bush configured to support the journal, the bearing bush comprising:
  a cylindrical circumferential wall radially delimiting an interior for receiving rolling elements and the journal,
  a base axially delimiting the interior, and
  a slip disk centrally mounted to the base and configured to be contacted by the journal,
 wherein the base includes a conical portion between the cylindrical circumferential wall and a flat central portion,
 wherein the slip disk is mounted on the flat central portion,
 wherein the journal has a flat central end surface abutting against the slip disk, and
 wherein the flat central end surface has a greater roughness than a roughness of the flat central portion.

6. The bearing bus according to claim 5,
wherein the slip disk has a diameter 0.25 to 0.33 times an inner diameter of the circumferential wall.

7. The journal bearing assembly according to claim 5,
wherein the journal includes a conical section surrounding the flat central end surface, the conical section of the journal opposing the conical portion of the base.

8. The journal bearing assembly according to claim 5,
wherein the slip disk does not have a central opening.

9. A journal bearing assembly of a cardan shaft, comprising:
 a journal of a journal cross of the cardan shaft, and
 a bearing bush configured to support the journal, the bearing bush comprising:
  a cylindrical circumferential wall having an interior surface radially delimiting an interior for receiving rolling elements and the journal,
  a base having an interior surface axially delimiting the interior, and
  a slip disk centrally mounted in a depression in the base and configured to be contacted by the journal,
 wherein the journal has a flat central end surface abutting against the slip disk, and
 wherein the flat central end surface has a greater roughness than a roughness of a bottom of the depression.

10. The journal bearing assembly according to claim 9,
wherein the slip disk does not have a central opening.

* * * * *